Sept. 1, 1964 M. KUTS 3,146,653
DETACHABLE RUBBER BAND CUTTER
Filed Nov. 8, 1961 2 Sheets-Sheet 1

INVENTOR.
MATHEW KUTS
BY
ATTY.

Sept. 1, 1964 M. KUTS 3,146,653
DETACHABLE RUBBER BAND CUTTER
Filed Nov. 8, 1961 2 Sheets-Sheet 2
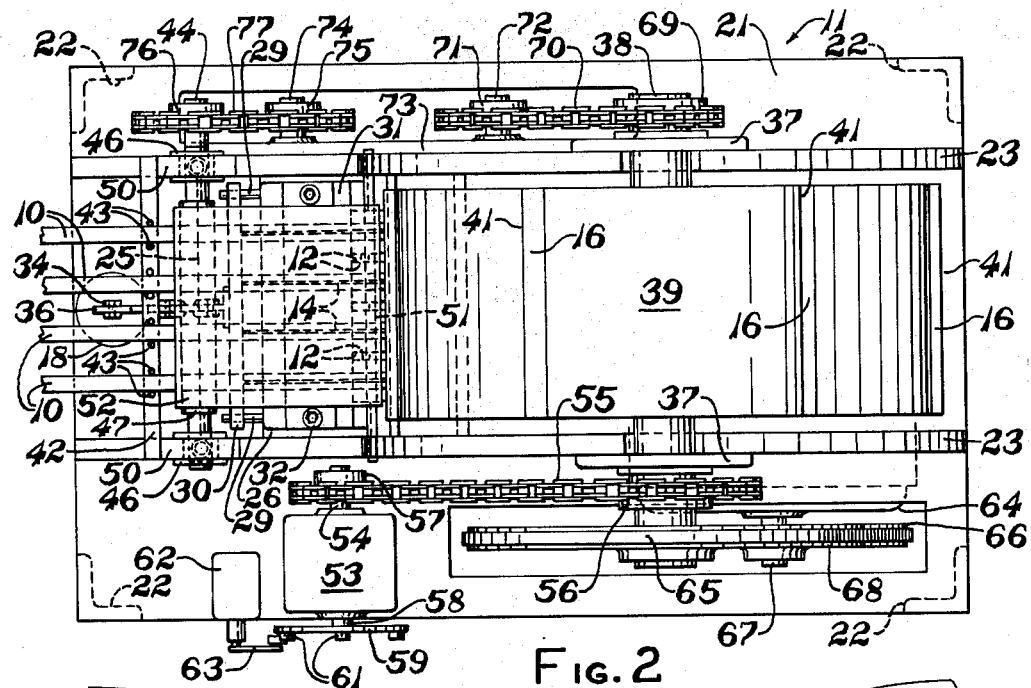
FIG. 2
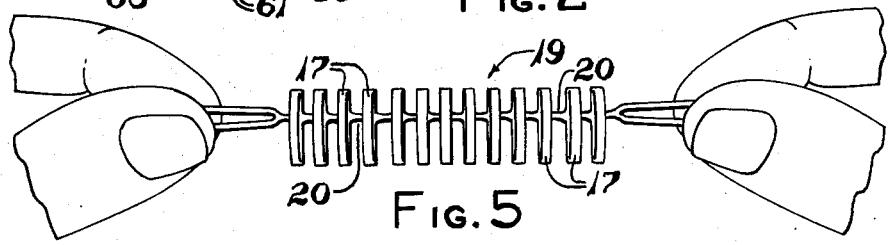
FIG. 5
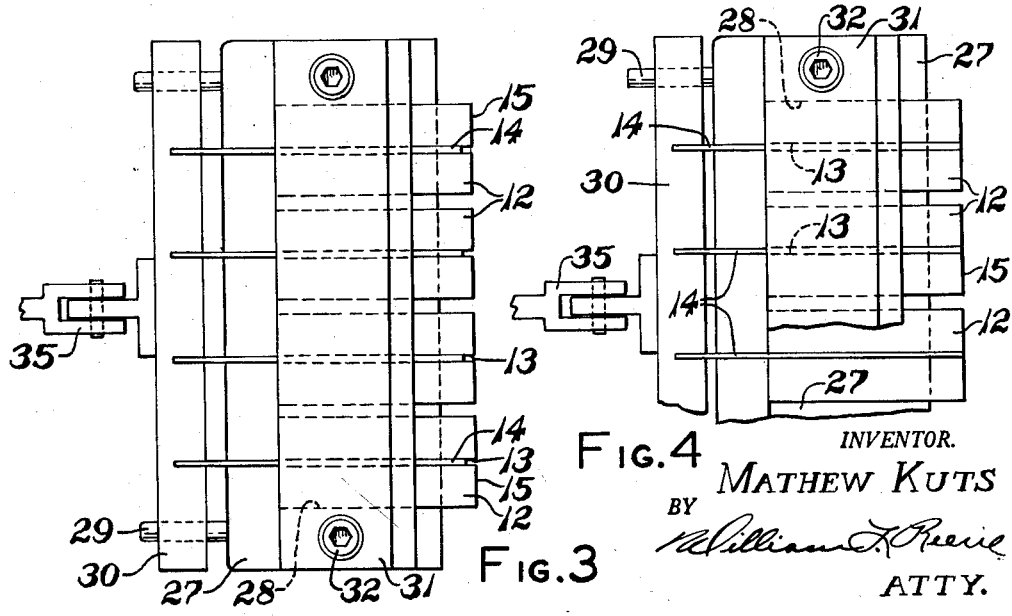
FIG. 4
FIG. 3
INVENTOR.
MATHEW KUTS
BY
William L. Reeve
ATTY.

United States Patent Office 3,146,653
Patented Sept. 1, 1964

3,146,653
DETACHABLE RUBBER BAND CUTTER
Mathew Kuts, Akron, Ohio, assignor to The B. F. Goodrich Company, New York, N.Y., a corporation of New York
Filed Nov. 8, 1961, Ser. No. 151,024
11 Claims. (Cl. 83—354)

This invention relates to the manufacture of elastomeric bands from elastomeric tubing and, more particularly, to the manufacture of rubber bands in groups of detachably joined bands of predetermined number.

In the manufacture of rubber bands it has been customary to cut individual bands from long lengths of vulcanized tubing of suitable gauge by means of apparatus which fed the tubing, at a speed dependent upon the desired width of finished band, over a stationary cutting bar as the shearing blades of a rotary cutting head moved past shearing engagement with the cutting bar. The bands were then weighed and packaged.

There is today a growing demand for packages containing as few as five small bands. These packages may be used with items such as plastic refrigerator bags for foodstuff leftovers. For each bag in these packages one rubber band must also be packaged. Whether dealing with a small package necessitating but five bands or an "economy" size of perhaps 60, it becomes impractical to weigh the bands to arrive at the correct number. There is no room for weighing error; the bands in the package must exactly correspond to the number of bags. Therefore, it has been necessary to count the bands for each package. To do this manually would result in prohibitive labor costs and a great waste of time. It became desirable then, to devise an apparatus for arranging the bands in precise groups of specified number for ease of packaging in precise numbers.

Also, many times after opening the package of bands the housewife would lose a band or two due to their natural tendency to become entangled with one another and fall on the floor when one was removed from the package. This made it desirable to produce and package the bands in such a way that they would not become entangled and a single band could easily be removed.

It is an object of this invention, therefore, to provide an apparatus for producing rubber bands in individual groups, eliminating the necessity for the counting or weighing of the bands by the person or machine packaging the bands.

It is another object of this invention to provide an apparatus for partially cutting rubber bands from elastomeric tubing such that each of the bands remains joined to adjacent bands over a short circumferential distance.

It is a further object of the present invention to provide an apparatus as described in the preceding paragraph in which means are provided to periodically completely cut the tubing from which the bands are formed.

It is a still further object of the present invention to provide an apparatus as described in the preceding paragraph wherein said means are actuated in response to the number of partial cuts of said tubing.

Further objects and advantages of the invention will be obvious to those skilled in the art to which it pertains from the following detailed description of a presently preferred embodiment of the invention and from the drawings forming a part of this application, in which:

FIG. 2 is a plan view of the apparatus;

FIG. 3 is a fragmentary plan view depicting the details of the cutting bars with their interrupter cutting inserts in retracted positions;

FIG. 4 is similar to FIG. 3 except with portions broken away and illustrating the position of the interrupter cutting inserts in advanced, cutting position; and FIG. 5 is an illustration of a group of fifteen detachable rubber bands, manufactured with the apparatus shown in the other views, in extended condition.

Figure 1:
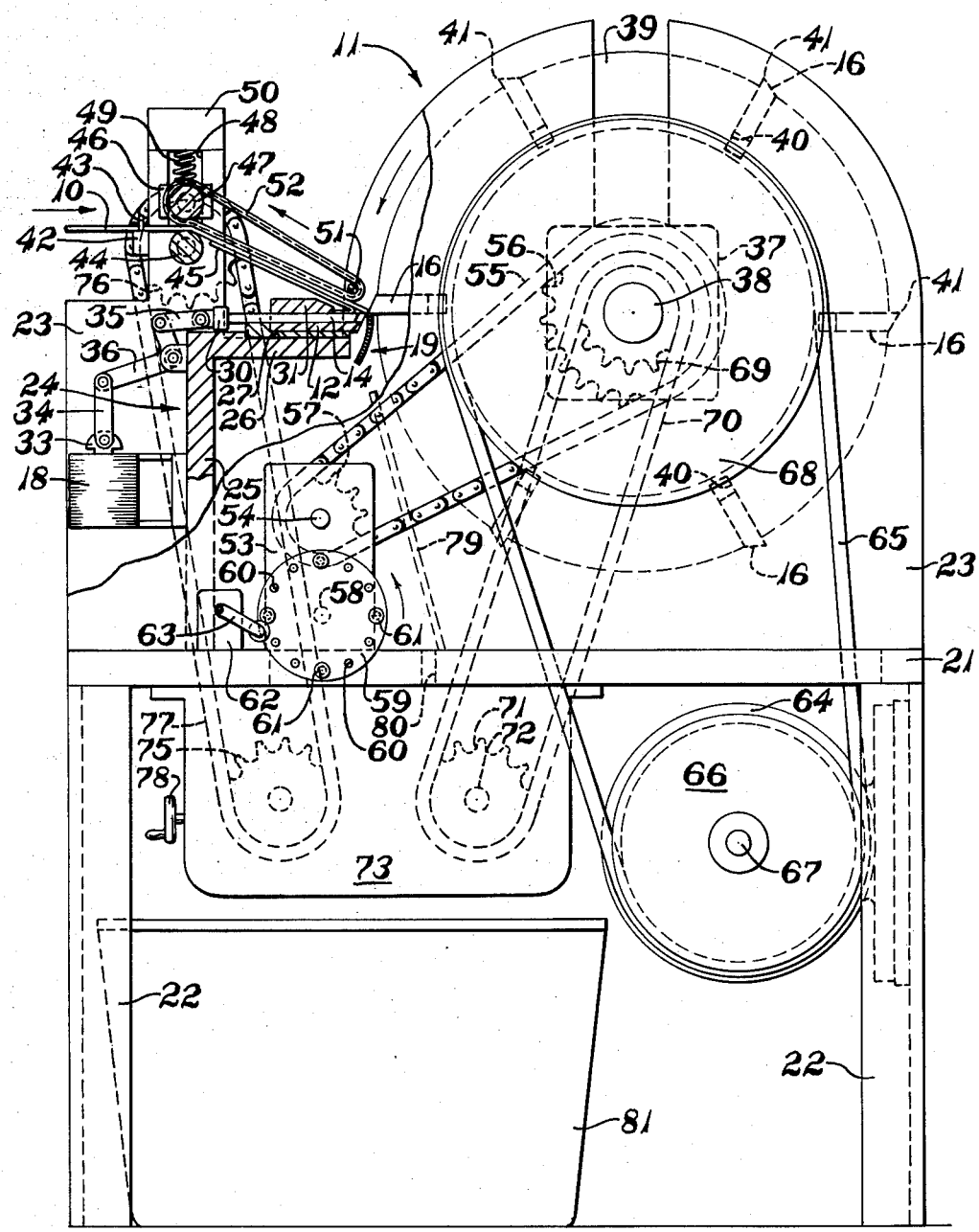
FIG. 1 is a side elevational view of the apparatus with portions partially cut away for ease of viewing.

As seen in FIG. 2, four vulcanized elastomeric tubes 10 are fed in the direction of their lengths to the apparatus 11 where they pass over cutting bars 12. The cutting bars are slotted as at 13 to receive interrupter cutting segments 14, normally held in retracted position as shown in FIG. 3. As the tubes 10 pass over the cutting edges 15 of bars 12 they are cut by knives 16 being moved past bars 12. Due to the slot 13 in each bar 12 the tube 10 is incompletely cut and the bands 17 remain joined to one another. After a predetermined number of incomplete cuts have been made, a single acting solenoid 18, operatively connected to the cutting segments 14, is momentarily actuated to advance the segments 14 to the full, tube cutting position shown in FIG. 4. The cutting bars 12 thus each present an effectively continuous cutting edge to completely cut through the tube 10 to produce a unit 19 consisting of the desired number of bands 17, held one to the other by a small uncut portion of their circumference, as at 20 in FIG. 5. The size of the portion 20 is determined by the width of the slots 13 in cutter bars 12.

It will be seen that single bands 17 may easily be removed from the unit 19 by simply breaking the connecting portion 20 of one of the end bands. The remaining bands of the unit 19 are thus retained together without becoming misplaced or entangled with one another.

The apparatus 11 is mounted on a platform 21 raised an appropriate height from the floor level by means of four legs 22. Two parallel vertical side supports 23 are mounted on the upper surface of platform 21. Mounted between the side supports 23 is an angle support member 24 having a vertical portion 25, and a horizontal portion 26 projecting from the upper end of portion 25. Mounted on the upper side of portion 26 is a cutting bar holder 27 which is recessed as at 28 to receive cutting bars 12. Projecting from one end of holder 27 are a pair of guide rods 29 which slideably support an interrupter tool holder 30. Each cutting bar 12 is vertically recessed, as at 13, from one end to the other. Interrupter cutting segments 14 mounted on holder 30 are each partially received by one of the recesses 13 for horizontal sliding movement therein. A retaining bar 31, held to holder 27 by bolts 32, clamps cutting bars 12 in the recesses 28 of holder 27. The length of each of the cutting segments 14 is such that when interrupter holder 30 is moved to the position shown in FIG. 4 the ends of the cutting segments 14 form a continuous cutting edge with the edges 15 of cutter bars 12. Mounted on the outer side of the vertical portion 25 of member 24 is a single-acting solenoid 18 having a moving core 33. Movement of core 33 is transmitted to interrupter tool holder 30 by means of pairs of pivoted links 34, 35 and a crank arm 36.

Journalled in pillow block 37 mounted on side supports 23 is a rotatable shaft 38 on which is mounted a drum 39. Extending from side to side of drum 39, parallel to its axis of rotation are a plurality of circumferentially spaced radial slots 40. In each slot 40 is mounted a knife 16, by means not shown. The knives 16 are positioned such that, as drum 39 is rotated, the knives' cutting edges 41 move to and from cooperative cutting engagement with the cutting edges 15 of cutting bars 12.

Uncut tubes 10 coming to the apparatus 11 pass over a horizontal support bar 42 mounted on side supports 23, and are separated from one another by means of vertical guide pins 43 mounted on bar 42. The tubes 10 then pass over a friction drive roller 44 journalled between side supports 23 and slide down an inclined support member 45, also mounted between supports 23, which member is inclined from roller 44 to a position closely adjacent the cutting edges 15 of cutting bars 12. Mounted above friction roller 44 in sliding journals 46 is a rotatable roller 47. Journals 46 are slideably mounted for vertical movement in slideways 48 formed in side supports 23 and are each urged downward under the force of a spring 49, which is compressed between the journal 46 and a retaining bar 50 mounted across the open end of slideway 48. Another roller 51 is journalled between side supports 23 near the discharge end of inclined member 45. A lightly reinforced elastomeric belt 52 is trained about rollers 47 and 51, and is driven in the direction of movement of the tubes 10 by contact with the tubes. Thus, as different gauge tubes 10 are fed into the machine 11 the roller 47 and belt 52 are automatically lowered or raised as necessary to maintain contact with the tubes.

A speed reducer 53 is mounted on top of platform 21 to one side of one of the side supports 23. Its input shaft 54 is driven by means of a chain 55 passing about a large sprocket 56 mounted on drum shaft 38 and a small sprocket 57 mounted on input shaft 54. Mounted on the output shaft 58 of reducer 53 is an indexing disc 59 having a plurality of circumferentially spaced indexing holes 60 in which indexing pins 61 may be placed. Also mounted on platform 21 to one side of reducer 53 is a limit switch 62 having a switch arm 63 engageable with pins 61 as disc 59 is rotated in response to rotation of drum 39. Actuation of switch 62 by such engagement between arm 63 and pins 61 causes actuation of solenoid 18.

The drum 39 is rotated by means of a motor 64 mounted between two of the legs 22 beneath platform 21. A drive belt 65 is trained about a sheave 66 on motor shaft 67 and a sheave 68 mounted on drum shaft 38. Power to drive the belt 52 is taken from a sprocket 69 mounted on drum shaft 38 by means of a chain 70 passing about sprocket 69 and also passing about the drive sprocket 71 on the input shaft 72 of a variable speed reducer 73, mounted on the underside of platform 21. Mounted on the output shaft 74 of reducer 73 is a sprocket 75 connected to a sprocket 76 mounted at one end of friction drive roller 44 by means of a chain 77.

The apparatus will be more completely understood from the following operating description.

*Operating Description*

Prior to starting the apparatus 11, the operator must place the indexing pins 61 in the appropriate indexing holes 60 of the indexing disc 59 depending upon the number of bands 17 desired in each finished unit 19. Referring to FIG. 1, it will be seen that there are six cutting knives 16 equally spaced about drum 39, giving one cut for each sixty degrees of rotation of the drum. There are twelve equally spaced indexing holes 60 in indexing disc 59. Hence, if the reducer 53 and associated sprockets 56 and 57 are selected to give ten rotations of drum 39 for one rotation of indexing disc 59, it follows that with pins 61 placed as shown in FIG. 1, i.e., four pins, each ninety degrees apart, limit switch 62 will be actuated to energize solenoid 18 at each fifteenth cut to give a finished band unit 19 of fifteen bands 17, as seen in FIG. 5.

As a further illustration, should pins 61 be placed in all of the indexing holes 60 it will be seen that the completed band units would contain but five bands 17

Having placed the indexing pins for the desired number of bands 17 per unit 19, the operator adjusts the handwheel 78 of the variable speed transmission 73 to give the proper tube feeding speed to friction drive roller 44, a high speed resulting in wide bands 17 and a low speed in narrow bands. The operator then starts motor 64, by means not shown, and begins feeding tubes 10 into the bight of drive roller 44 and belt 52. The tubes are advanced to the cutting edges 15 of cutter bars 12 where they are cut by knives 16 being rotated past by drum 39. Due to the slot 13 in each bar 12 a small portion 20 of each tube is left uncut. When one of the indexing pins 61 engages switch arm 63 and actuates limit switch 62, solenoid 18 is energized causing its core 33 to rise. Through the connection of links 34 and 35 and crank arm 36 the movement of core 33 forces tool holder 30 and cutting segments 14 to move in slots 13 to form a continuous cutting edge 15 on each cutter bar 12 to completely cut the tube and allow one of the units 19 to fall from each bar 12. A baffle plate 79 mounted on platform 21 prevents the finished units from sticking to the knives 16 and being carried about drum 39, and directs the units to an opening 80 formed in platform 21 through which they drop to a receiving bin 81 below. As the indexing pin 61 disengages limit switch 62, solenoid 18 is deenergized and the core 33 is returned to its original position under the force of gravity to retract segments 14 from their cutting positions. The apparatus 11 continues, partially cutting the tubes 10 until the next indexing pin 61 engages limit switch 62 to begin another cycle.

Having thus described the invention, I claim:

1. Apparatus for the manufacture of groups of bands from elastomeric tubing by transverse cutting thereof with the bands of each group in joined relationship by an integral portion of uncut tubing, the said apparatus comprising a pair of cooperating cutting members, means to move a tube of elastomeric material in the direction of its length between said cutting members transversely thereof, means to move one of said cutting members toward and from tube cutting cooperation with the other of said members in timed relationship with movement of said tube, the said other cutting member including a portion of its cutting surface mounted for retraction from cutting cooperation with said one member, means normally holding said portion in retracted position thereby preventing complete severing of cut portions of said tube, and means responsive to a predetermined number of movements of said one cutting member to effect movement of said retractable portion of the other member into cutting cooperation with the said one cutting member to thereby effect complete severing from the tube of the group of incompletely cut bands.

2. An apparatus as defined in claim 1 and further comprising manually settable means for selecting the number of movements of said one cutting member before the said retractable portion of the other member is moved to tube cutting position.

3. An apparatus as defined in claim 1 and further comprising means to vary the speed of movement of said tube relative to the rate of movement of said one cutting member to thereby vary the width of the individual bands.

4. An apparatus as defined in claim 1 wherein said one cutting member is a radially extending knife blade mounted upon a support rotatable about an axis extending parallel with a rectilinear edge of said other cutting member, the retractable portion of which edge is formed upon the forward portion of a longitudinally movable slide.

5. An apparatus as defined in claim 1 wherein means for moving said tube effects such movement continuously during movement of said one cutting member.

6. An apparatus for the manufacture of rubber bands from elastomeric tubing in groups of predetermined number by which the bands of each group remain in easily broken, joined relationship; comprising advancing means to move a plurality of elastomeric tubes in the directions of their lengths in parallel spaced relationship; a plurality of cutting bars each disposed in the path of one of said tubes; a slideway formed in each bar extending from one end to the other thereof; a pair of adjacent colinear cutting edges formed at one end of each of said bars separated from one another by said slideway; a cutting insert slideably mounted in each of said slideways for movement to and from a position to effectively bridge said cutting edges into a continuous cutting edge on each cutting bar, moving means to move said insert to and from said position; a drum rotatably mounted on said apparatus axially parallel to said cutting edges; a plurality of cutting knives mounted on the outer circumferential surface of said drum, parallel to the axis thereof and in circumferentially equally spaced relationship to one another; means to rotate said drum to bring said knives mounted thereon into cooperative shearing engagement with said cutting bars; means responsive to predetermined rotation of said drum to actuate said moving means to move each of said inserts to said position for cooperative shearing engagement with said cutting knives to completely cut said tubing once for each of said groups.

7. Apparatus as defined in claim 6, in which said means to actuate said moving means further comprises adjustable sensing means responsive to predetermined rotation of said drum whereby the number of bands in each group may be varied.

8. Apparatus as defined in claim 6, said advancing means further including means to vary the speed of advancement of said tubing relative to a given speed of rotation of said drum to thereby vary the width of the individual bands being cut.

9. Apparatus for the manufacture of groups of rubber bands from elastomeric tubing moving in the direction of its length, whereby said bands of each group remain in joined relationship by incomplete circumferential cutting of said tubing; comprising a cutting bar, having a cutting edge, mounted on said apparatus, and having a portion of said bar retractible to discontinue said cutting edge; means to move said tubing in the direction of its length transversely of said cutting edge; a knife holder rotatably mounted on said apparatus; means to rotate said holder; at least one shearing knife mounted on said holder for shearing cooperation with said cutting edge as said holder is rotated, whereby said tubing is cut to a depth less than the outside diameter of said tubing when said portion is retracted and cut to a depth at least equal to said diameter when said portion is extended; and means to actuate said portion to provide discontinuity in said cutting edge in timed response to the rotation of said holder.

10. Apparatus for the manufacture from elastomeric tubing of rubber bands in groups of predetermined number, the bands of each group remaining in easily broken, joined relationship by incomplete cutting of said tubing; comprising a segmented cutting bar mounted on said apparatus and having a cutting edge formed thereon; means to move said tubing in the direction of its length across said cutting edge; means to move at least one segment of said cutting bar to and from said cutting edge to thereby discontinue said cutting edge; a drum rotatably mounted on said apparatus; a plurality of shearing knives mounted on said drum for shearing cooperation with said cutting edge, whereby said tubing is cut to a depth less than the outside diameter thereof when said segment is moved away from said cutting edge, and said tubing is cut to a depth at least equal to said outside diameter when said segment is moved to said cutting edge; and means to actuate said last-mentioned means to move said segment to said edge after intervals of predetermined rotation of said drum.

11. An apparatus for the manufacture of rubber bands from elastomeric tubing in groups of predetermined number by means of which the bands of each group remain in easily broken, joined relationship; comprising a cutting bar mounted on said apparatus; a slideway formed in said bar and extending from one end to the other thereof; a pair of adjacent colinear cutting edges formed at one end of said bar and separated by said slideway; a cutting insert, having a cutting edge for cooperating with said edges, slideably mounted in said slideway; means to move said insert toward and away from said cutting edges whereby said edge and edges form a substantially continuous edge when said insert is moved toward said edges; a drum rotatably mounted on said apparatus; a plurality of cutting knives mounted on said drum for cooperative shearing engagement with said cutting edges, whereby said tubing is cut to a depth less than the outside diameter thereof; means to rotate said drum; control means responsive to a predetermined amount of rotation of said drum to actuate said insert moving means to move said insert toward said edges for cooperative shearing engagement with said knives, whereby said tubing is cut to a depth at least equal to the outside diameter thereof; and means to move said tubing in the direction of its length across said cutting edges in response to rotation of said drum.

References Cited in the file of this patent

UNITED STATES PATENTS

| 509,854 | Sawyer | Nov. 28, 1893 |
| 1,874,902 | Clyne | Aug. 30, 1932 |
| 2,587,030 | Carlson | Feb. 26, 1952 |
| 2,751,982 | Schlemmer | June 26, 1956 |
| 2,808,884 | Shann et al. | Oct. 8, 1957 |
| 2,838,112 | Feitl | June 10, 1958 |
| 2,870,840 | Kwitek | Jan. 27, 1959 |
| 3,086,416 | Minarik | Apr. 23, 1963 |

FOREIGN PATENTS

| 867,071 | Great Britain | May 3, 1961 |